United States Patent [19]
Arthur et al.

[11] Patent Number: 5,092,350
[45] Date of Patent: Mar. 3, 1992

[54] CIGARETTE MANUFACTURE

[75] Inventors: Hugh M. Arthur; Reginald C. Bolt, both of High Wycombe, United Kingdom; Ian A. Ramsay; Iain E. Ross, both of Dundee, Scotland

[73] Assignee: Molins, PLC, London, England

[21] Appl. No.: 669,422

[22] Filed: Nov. 8, 1984

[30] Foreign Application Priority Data

Nov. 11, 1983 [GB] United Kingdom ............... 8330178

[51] Int. Cl.⁵ ........................... A24C 5/60; A24C 5/00
[52] U.S. Cl. .................................................. 131/281
[58] Field of Search ..................................... 131/281

[56] References Cited
U.S. PATENT DOCUMENTS
4,281,670 8/1981 Heitmann ........................... 131/281

Primary Examiner—V. Millin
Attorney, Agent, or Firm—Antonelli, Terry, Stout & Kraus

[57] ABSTRACT

Cigarette tipping paper is perforated by a laser 31 emitting a beam which is directed onto the tipping paper via an acousto-optical beam deflector 33 and a beam splitter 34 producing two parallel perforation tracks 24 along the tipping paper. Each track may include a number of rows of perforations, the laser beam being deflected for that purpose by the acousto-optical device. The porosity of the tipping paper and/or the dilution of the completed cigarettes can be controlled in various ways, particularly by the use of an acousto-optical device; the latter may be used to vary the perforation pattern, the laser beam being directed onto a heat sink 52 when it is not required to perforate the tipping paper. Control of the perforation pattern, as well as allowing different patterns to be applied, is used to control the dilution factor of the finished cigarettes.

27 Claims, 4 Drawing Sheets

CIGARETTE MANUFACTURE

This invention is concerned with the manufacture of ventilated cigarettes, that is cigarettes with ventilation apertures admitting atmospheric air into the filter so as to dilute the smoke drawn in by the smoker. In particular this invention is concerned with the perforation of a web of cigarette tipping paper, portions of which are afterwards used to join filters to tobacco rod portions.

According to a first aspect of this invention there is provided a method of producing ventilated filter cigarettes, comprising directing a laser beam onto a web of cigarette tipping paper, from which portions are to be cut to join filters to tobacco rod portions, to produce at least one longitudinally extending perforation track along the web; and controlling the position of the laser beam by means of a laser beam deflector to direct the beam either along a path in which it impinges on and perforates the web, or to direct it in a manner such as not to perforate the web, so as to control the formation of perforations in the web. Preferably the formation of perforations and particularly the amount of material removed from the web is controlled in response to the porosity of the perforated web and/or the dilution of the finished cigarettes.

According to a second aspect of this invention there is provided an apparatus for producing ventilated cigarettes, comprising means for generating a laser beam; means for directing the laser beam onto a web of cigarette tipping paper to produce at least one longitudinally extending perforation track along the web; filter assembly means including means for cutting the perforated web into portions and means for joining filters to tobacco rods with said portions; and control means for controlling the position of the laser beam, including a laser beam deflector arranged to direct the beam either along a path in which it impinges on and perforates the web or to divert it in a manner such as not to perforate the web, so as to control the formation of perforations in the web. Preferably the formation of perforations and particularly the amount of material removed from the web is controlled in response to the porosity of the perforated web and/or the dilution of the finished cigarettes.

In a preferred apparatus the laser beam deflector is an acousto-optical device having diffraction properties which vary with the frequency of an applied alternating voltage. Preferably, the beam deflecting device is controlled so as to produce a predetermined pattern of perforations in the web, the pattern being adjusted in response to the porosity of the perforated web and/or the dilution of finished cigarettes so as to maintain cigarette dilution at a substantially constant average level. Adjustment of the perforation pattern may, for example, involve control of the longitudinal distance between successive perforations, elimination of a variable number of perforations in a basically set pattern, variation of the length and/or width of some or all of the perforations, or a combination of at least two of such controls In a preferred apparatus the beam is arranged to impinge on a heat sink while it is not required to perforate the web. Alternatively, the beam may be subjected to continuous rapid deflection while it is not required to perforate, so that perforation ceases because the beam does not remain in any position long enough to perforate the web.

In a preferred apparatus for perforating a web of cigarette tipping paper the beam, after passing through the deflecting device, is split into two secondary beams of substantially equal intensity which simultaneously perforate the web at two positions to form two laterally spaced perforation tracks. Thus the deflecting device serves to deflect both secondary beams. Preferably the two secondary beams are directed towards the web by beam-deflecting mirrors, and the distance between the perforation tracks formed by the two beams is adjustable; such adjustment is preferably achieved by rotating, about the mean center line of the primary beam (before splitting), an assembly including the beam splitter and mirrors and lenses for the respective secondary beams. Alternatively, instead of beam deflection being achieved by a common beam deflector, there may be two beam deflectors for deflecting the respective secondary beams, each beam deflector being preferably controllable independently of the other.

According to a third aspect of this invention there is provided an apparatus for forming a predetermined pattern of perforations in a moving component of the cigarette industry (especially but not necessarily cigarette tipping paper for use in making filter tipped cigarettes) comprising means for generating a laser beam for perforating the component, and an acousto-optical or other electrically driven beam deflector arranged in the path of the beam and having a controllable drive whereby deflection of the beam is controlled to cause the beam to impinge on and perforate the component at selected positions.

Preferably the apparatus also includes a heat sink onto which the beam deflector is arranged to direct the beam when the latter is not required to perforate the component. Preferably in the case of an acousto-optical beam deflector the path of the beam, when inoperative (i.e. leading to the heat sink), extends from the beam deflector in a direction in line with the beam entering the beam deflector. That is to say, there is zero deflection of the beam, which condition applies when no drive signal (alternating voltage) is applied to the beam deflector. When an alternating drive signal is applied to the beam deflector, the proportion of the incoming beam that passes out of the beam deflector along the deflected path is dependent (up to a predetermined upper limit) upon the amplitude of the drive signal; that feature can be used to control the power of the beam impinging on the component and hence the perforation width, and/or the depth in the case of cigarette perforation.

If the workpiece is a finished cigarette, it may be rotated about its own axis as described in British patent specification No. 1602133. Two of more rows of perforations may be formed in each cigarette by deflecting the initial beam laterally with respect to the direction of movement of the cigarettes as described above in relation to tipping paper. In addition, or as an alternative, an acousto-optic or other electrically driven beam deflector may be used to deflect the beam so that its impingement point on each cigarette briefly follows the cigarette while forming each perforation; this would enable a single row of perforations to be formed by a relatively low-powered laser.

According to a fourth aspect of this invention there is provided apparatus for producing ventilated filter cigarettes, comprising means for cutting a web of cigarette tipping paper into a series of portions; means for joining pairs of cigarette rods to double length filters to form a succession of double cigarette assemblies; means for cutting each assembly in half to produce two filter cigarettes; means for producing a primary laser beam; means for splitting the primary beam to produce two secondary beams of substantially equal power; means for directing each secondary beam onto the cigarette tipping paper to provide at least one longitudinally extending perforation track in each subsequently formed cigarette; means for measuring the dilution of the finished cigarettes and means for controlling the secondary beams in response to said dilution.

Preferably the secondary beams are deflected by deflecting the primary beam by means of an acousto-optical beam deflector. Alternatively, two separate acousto-optical beam deflectors may be used to deflect the respective secondary beams.

There is preferably provision for ensuring that the cigarettes all have substantially the same dilution factor; i.e. that the two secondary beams produce substantially the same dilution factor in their respective rows of cigarettes. Ways in which that can be achieved are described below with reference to the accompanying drawings.

According to a fifth aspect of this invention, apparatus for perforating cigarette tipping paper comprises means for producing a primary laser beam, means for directing the primary laser beam towards the path to be followed by a web of tipping paper, in a direction normal to the plane of the web and in alignment substantially with the center line of the web; means for splitting the primary laser beam to produce two parallel secondary beams and for directing and focusing the two secondary laser beams onto the web to produce two laterally spaced perforation tracks on the web, each comprising at least one row of perforations; and means for rotatably mounting an assembly including the secondary beam focusing means, rotation being about the axis or mean axis of the primary beam so that angular adjustment of the assembly about that axis alters the spacing between the two perforation tracks. If each perforation track is required to include two or more rows of perforations, that can be achieved by deflecting the primary beam; rotation of the assembly to alter the track spacing does not affect the spacing between the rows in each track for a given deflection of the primary beam.

The invention will now be described, by way of example only, with reference to the accompanying drawings of which:

Figure 1:
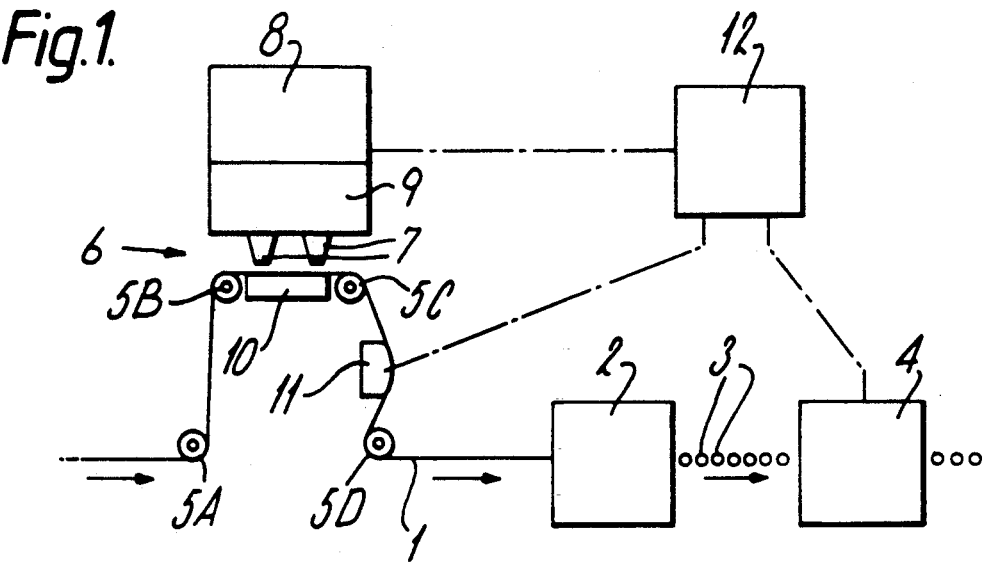
FIG. 1 is a diagrammatic representation of a machine for assembling and testing filter cigarettes, including means for perforating the cigarette tipping paper.
Figure 8:
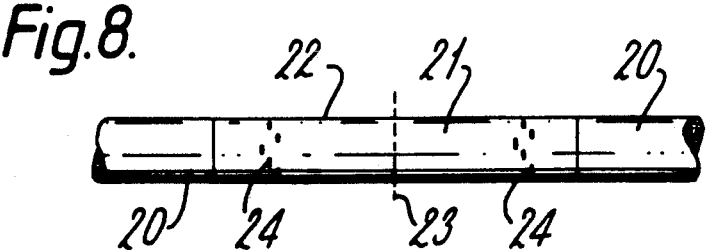
FIG. 8 shows part of a perforated double cigarette assembly.

A filter attachment machine is shown diagrammatically in FIG. 1 in which cigarette rods, filter rods and a web of cigarette tipping paper 1 are supplied to an assembly unit 2. The assembly unit cuts the tipping paper into portions, cuts the filter rods into double length filter portions and then joins two cigarette rods 20 to each double filter 21 by means of a portion of the tipping paper 22 to form a double cigarette assembly, as shown in FIG. 8. Each assembly is cut in half along a line 23, and the resulting two rows of cigarettes 3 (FIG. 1) are then transported to a cigarette inspection device 4, which may for example be as described in British Patent Specification No. 2050804. The inspection device 4 detects and rejects incorrectly assembled and damaged cigarettes, and measures the dilution of each satisfactory cigarette; it perferably produces separate average dilution outputs for the respective two rows of cigarettes.

For the purpose of perforation, the web of tipping paper 1 is directed by guide rollers 5A, 5B, 5C, and 5D through a perforating unit 6 before being fed to the assembly unit 2. At the perforating unit two secondary laser beams (one emitted from each of a pair of nozzles 7) produce two laterally spaced perforation tracks which form two laterally spaced perforation tracks which are shown as circumferentially extending perforation bands 24 around the cigarette assembly in FIG. 8. Each track consists of from one to eight rows of perforations; multiple rows are formed by deflecting the laser beam across the web as described below. In FIG. 8 three rows are shown.

The perforating unit 6 consists of a laser generating and deflecting section 8, and a splitting and focusing assembly 9. The assembly 9 rotates about a vertical axis to allow for adjustment of the spacing between the perforation tracks. (In the setting producing maximum spacing, one of the nozzles 7 would be hidden behind the other in FIG. 1, though in practice the nozzles are not intended to reach those positions.) As the web of tipping paper 1 passes under the nozzles 7 it is supported by a guide assembly 10, which is described in greater detail with reference to FIGS. 6 and 7. The guide assembly 10 is adjustable to ensure that both of the laser beams are correctly focused on the tipping paper.

After the tipping paper has been perforated it is guided over a porosity measuring device 11, a suitable device being described in British Patent Application No. 8313736. In an alternative arrangement the guide roller 5D may be replaced by a fixed guide member in which the porosity measuring air passages are incorporated.

The number and/or size of perforations formed in the tipping paper is adjusted (within pre-programmed limits) by a control unit 12 which controls the operation of the perforating unit in response to signals indicative of web porosity and cigarette dilution from the porosity measuring device 11 and the cigarette inspection device 4 respectively.

Figure 3:
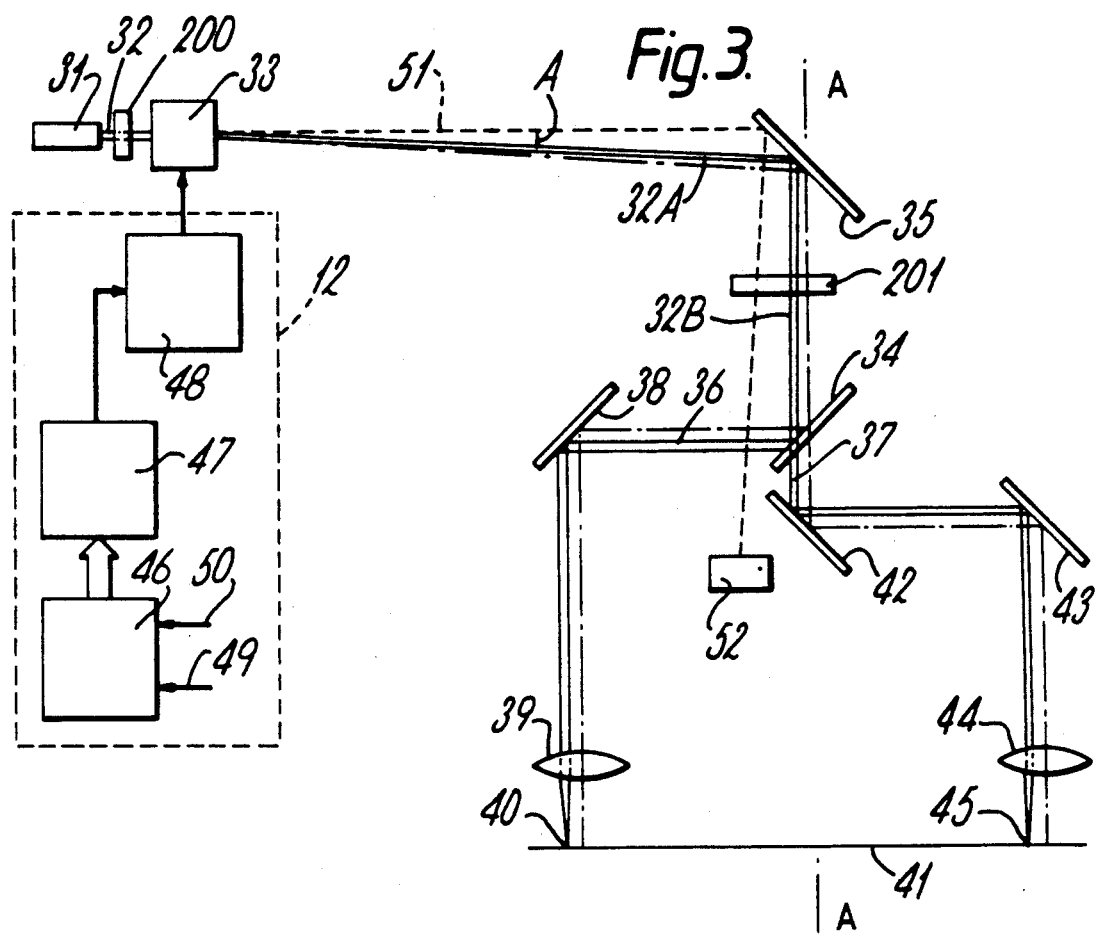
FIG. 3 is a more complete diagrammatic representation of the perforator of FIG. 1.

The laser apparatus (the combination of parts 8 and 9 of FIG. 1) is shown diagrammatically in FIG. 3. A carbon dioxide laser 31 (e.g. 10.6 micrometer wavelength) produces a continuous primary laser beam 32 which is directed through an acousto-optical beam deflector 33, via a lens system 200 comprising or including a cylindrical lens, and continues as a beam 32A, 32B towards a semi-reflective mirror 34 via a mirror 35 and a lens system 201 comprising or including a cylindrical lens. The acousto-optical beam deflector receives a drive signal in the form of a high frequency alternating voltage (e.g., radio frequency in the range 50-90 MHz). Inside the deflector a group of transducers produces acoustic vibrations within a germanium crystal, the diffraction properties of which vary with the frequency of these vibrations. Such a device is available from Isomet Corporation, U.S.A., being basically like their Model LS600. The laser 31 may, for example, have a power within the range 120 to 250 Watts.

The purpose of the lens system 200 is to change the cross-section of the beam from circular to elliptical, the latter being the shape that is preferable for the beam deflector to minimize the power density and facilitate cooling of the beam deflector. By way of example, the elliptical shape may have major and minor axes of 25 mm and 4 mm respectively. The lens system 201 returns the beam to a circular cross-section.

The mirror 34 partially reflects the beam so as to produce a first secondary beam 36 while allowing a second secondary beam 37 of substantially equal intensity to pass through. The first beam 36 is reflected by a mirror 38 towards a lens system 39 which focuses the beam at a position 40 on a moving web of tipping paper 41, while the second beam 37 is reflected by mirrors 42 and 43 towards a lens system 44 which focuses the beam on the tipping paper at a position 45. The lens systems 39 and 44 may each comprise a pair of lenses to focus the beams properly on the paper while accommodating the necessary slight angular deflection of the beam as described below.

The control unit 12 consists of a feedback circuit 46, a pattern generator 47 and a drive unit 48. The feedback circuit (details of which are described with reference to FIG. 4) receives signals indicative of web porosity on a line 49 and cigarette dilution on a line 50, and generates a perforation demand signal which is supplied to the pattern generator 47. The perforation demand signal, which is in the form of a 4-bit parallel digital signal, varies in order to maintain the dilution of the finished cigarettes substantially constant. The pattern generator 47 also receives an indication of machine speed and produces a control signal which is applied to the drive unit 48. This control signal is in the form of a voltage which changes in steps. Each voltage change is converted by the drive unit 48 into a drive signal of different frequency so as to alter the angle A through which the primary beam 32A is deflected by the beam deflector 33. This results in similar deflection of the secondary beams 36 and 37 so that they impinge on the web at different positions across the width thereof.

When no drive signal is supplied to the beam deflector 33, the latter allows the primary beam 32 to continue in the same direction (i.e. without deflection) along a path 51 to a heat sink 52. Interruption of the perforation pattern in that way reduces the amount of material removed from the web in response to the measured web porosity and the cigarette dilution If a drive signal at below full amplitude is applied to the beam deflector then the power of the deflected beam 32A, 32B is reduced and an approximately complementary amount of light energy passes along the path 51 towards the heat sink. Even with the maximum drive signal, a proportion (approximately 20%) of the beam 32 passes straight through the beam deflector and continues towards the heat sink 52 (i.e. is not deflected).

Figure 2:
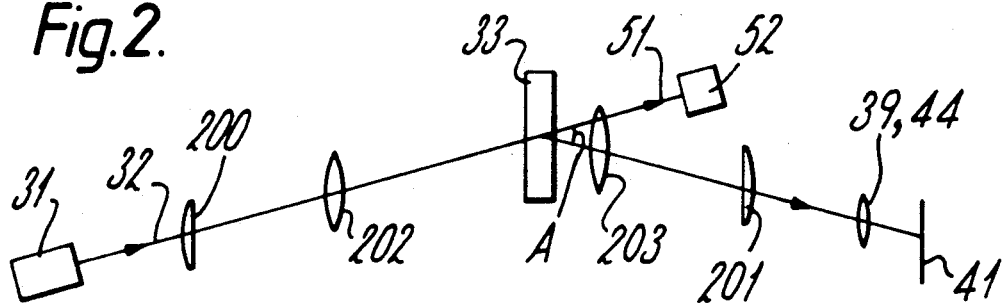
FIG. 2 shows a diagrammatic "unfolded" optical arrangement of the perforator.

FIG. 2 is a simple "unfolded" illustration of the optical arrangement in FIG. 3, equivalent parts having the same reference numerals as in FIG. 3. In addition it illustrates the preferred use of two further spherical lenses 202 and 203.

The splitting and focusing assembly 9 identified in FIG. 1 (consisting of mirrors 34, 38, 42 and 43, and lenses 39 and 44) is rotatable about an axis A—A (FIG. 3) to allow for adjustment of the spacing between the perforation tracks. It will be seen that the axis A—A lies along the vertical portion of the mean operative path (shown chain-dotted) of the beam 32B.

Figure 4:
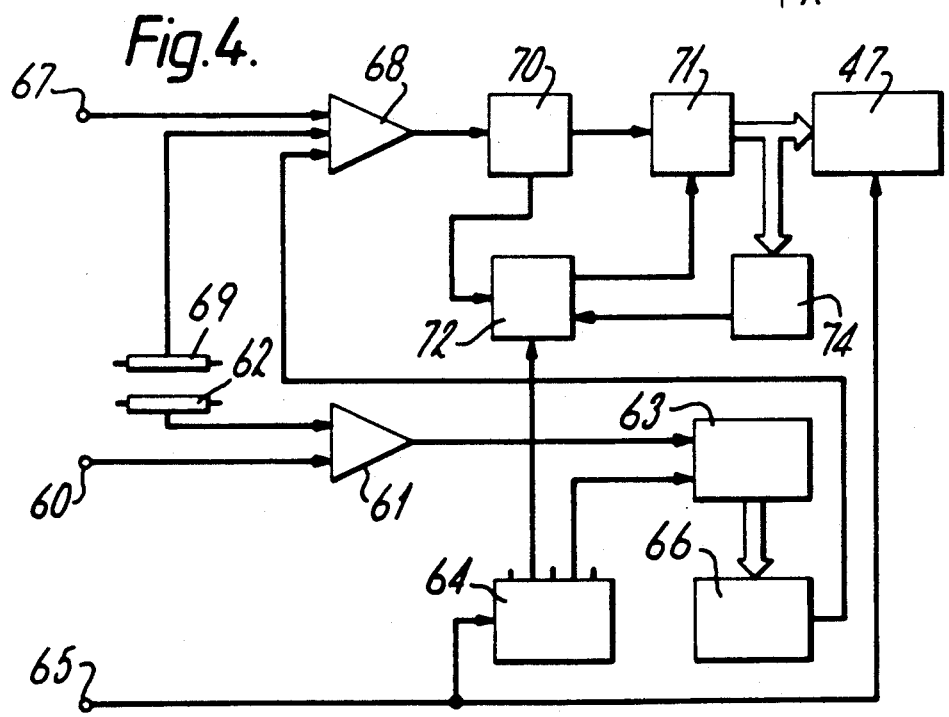
FIG. 4 is a block diagram of a feed-back circuit for controlling the operation of the perforator of FIG. 1.

A block diagram of the feedback circuit 46 is shown in FIG. 4. The cigarette inspection device 4 provides a dilution signal which is applied via a terminal 60 to a comparator 61 which also receives a dilution reference signal from a potentiometer 62. If the amplitude of the dilution signal is greater than the dilution reference signal, the comparator 61 produces a high output; if the amplitude of the dilution signal is lower than the dilution reference then the comparator 61 produces a low output. The output from the comparator 61 is applied to the up/down input of an 8-bit bi-directional counter 63 which receives clock pulses from a binary counter 64

A series of pulses, one of which is generated for each pair of cigarettes which passes through the cigarette inspection device, is applied to the binary counter 64 via a terminal 65. The counter 64 has a series of output stages each of which produces pulses at half the frequency of the previous stage. A suitable stage is selected for clocking the bi-directional counter 63 to ensure stability. In the example, the fourth stage has been selected so that the bi-directional counter 63 receives a clock pulse when every sixteenth pair of cigarettes passes through the inspection device 4.

The bi-directional counter 63 produces an 8-bit binary code which is applied to a digital-to-analogue converter 66 the output of which is an error signal which slowly increases with increasing deviation from the desired dilution level. Thus a lag is introduced which is needed because of the large number of cigarettes in the system between the perforating unit and the cigarette inspection device.

The output from the porosity measuring device 11 is applied via a terminal 67 to a summing amplifier 68 to improve the response time of the system to changes in web porosity. The summing amplifier 68 also receives the error signal from the digital-to-analogue convertor 66, and a negative porosity reference signal from a potentiometer 69. Under ideal operating conditions, the porosity signal and the error signal (which increase with increasing porosity or increasing dilution respectively) cancel with the porosity reference signal; however, in practice fluctuations occur owing to changes in material parameters and other variable conditions. The circuit is arranged to respond to substantial changes while ignoring small fluctuations which lie within a pre-set band.

The output from the summing amplifier 68 is applied to a comparator circuit 70. If the output from the summing amplifier 68 is negative then the output from the comparator circuit 70 is high. If, however, the output from the summing amplifier goes positive (indicating that the porosity of the web or the average dilution of the cigarettes is increasing) the output from the comparator circuit 70 goes low. The output from the comparator circuit 70 is applied to the up/down input of a 4-bit bi-directional counter 71 which counts up when a high signal is applied to its input and counts down when a low signal is applied to its input in response to clock pulses. Clock pulses are applied to counter 71 from the binary counter 64 via an enable/disable logic circuit 72. In this example the counter 71 is supplied with clock pulses from the second stage of counter 64, therefore a clock pulse is applied to counter 71 when every fourth cigarette passes through the cigarette inspection device. The enable/disable logic circuit 72 is arranged to block clock pulses if the output from the summing amplifier 68 is within the preset band.

The counter 71 provides the parallel 4-bit perforation demand signal to the pattern generator 47, which also receives a clock pulse via terminal 65 when each pair of cigarettes passes through the cigarette inspection device. The output from counter 71 is also applied to a decoder 74 which applies a disabling signal to the logic circuit 72 on detecting the maximum or minimum output of counter 71, thus preventing overflow or underflow.

The pattern generator 47 may be a microprocessor-based unit which generates the control signal in response to a programmed pattern, the perforation demand signal and the rate at which cigarettes are being produced. The pattern generator is programmed by a machine operator by means of switches or a keypad. The main variable parameters, in terms of the position of perforations in the cigarette tipping paper, are the number of rows, the row spacing, the step length and the blanking periods, the latter being the times during which the laser beam is dumped onto the heat sink 52 so as not to perforate. These parameters are determined automatically when a desired perforation pattern is selected from a range of patterns available to the operator. The total blanking period is controlled in response to the perforation demand signal; thus when the perforator is required to produce maximum web porosity the blanking period is zero, though in practice the system will normally operate with a certain amount of blanking so as to allow controlled adjustment both upwards and downwards.

Any number of rows between one and eight may be selected with a suitable row spacing (in the case of multiple rows) such that each perforation track has a width of up to 3 millimeters (or possibly greater). Patterns having many rows tend also to have short step lengths; thus micro-perforations (substantially invisible) may be provided in eight rows with a step length of 0.084 mm by generating 320 steps over each 27 mm length of tipping paper. Another program may for example provide macro-perforations (visible perforations) in two rows with a step length of 0.675 mm by generating 40 steps over each 27 mm length of tipping paper. Many other patterns may also be provided to achieve the desired cigarette dilution and the desired degree of perforation visibility. Moreover it is possible to have a combination of micro and macro perforations; for example, there may be one (or more) longitudinally-extending rows of macro-perforations and one or more rows of micro-perforations along either side (or both sides) of the row of macro-perforations. Another possibility is that special groups of visible perforations may be arranged to form recognizable emblems, letters or logos, possibly in combination with a background of micro-perforations.

Figure 5:
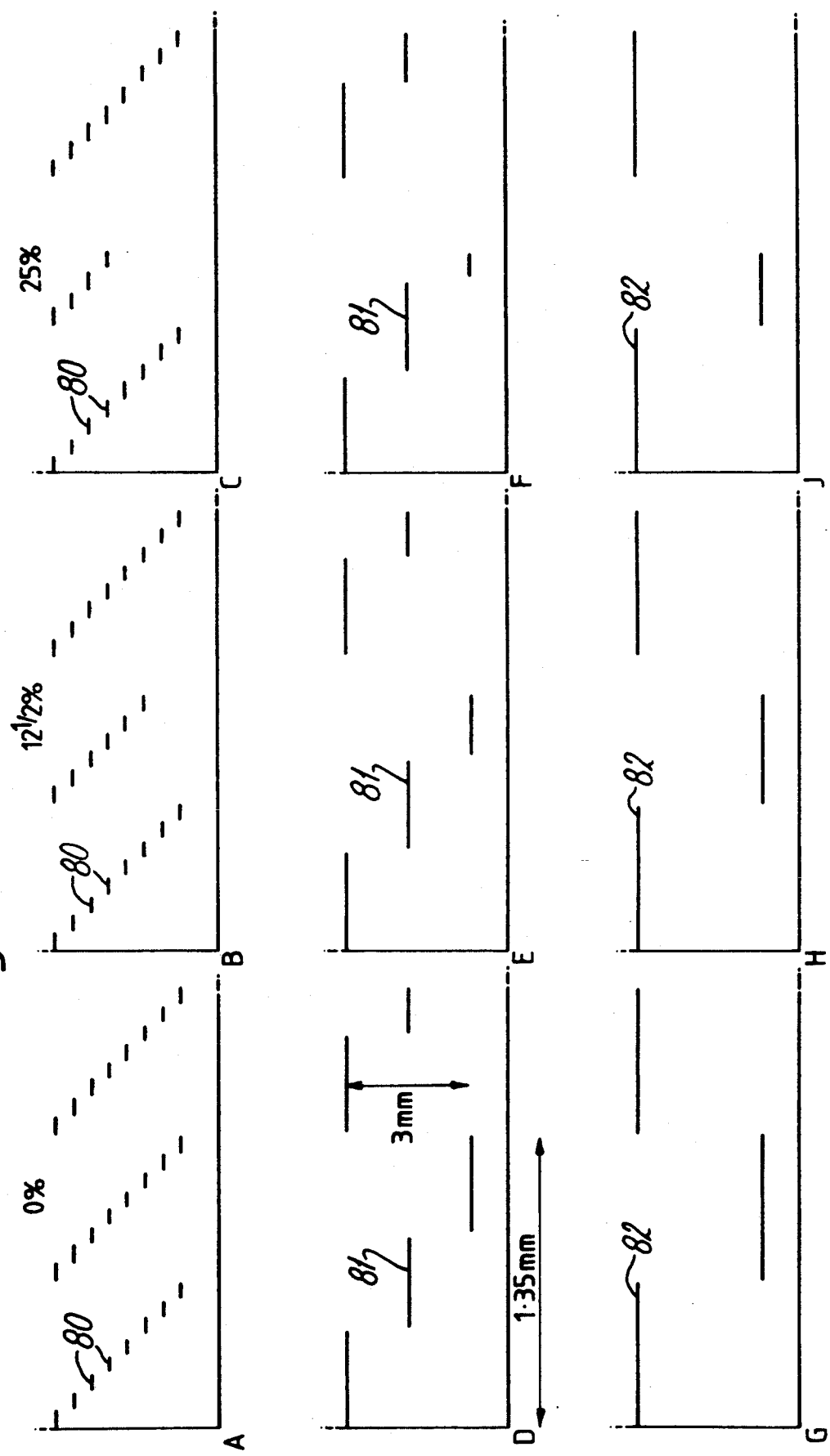
FIGS. 5A to 5J show perforation patterns which may be produced by the perforator.

Three perforation patterns are shown in FIG. 5, each with three blanking periods respectively of 0%, 12.5% and 25%. FIG. 5A shows micro-perforations 80 (on a much enlarged scale) in which eight rows are formed over a track 3 mm wide. Each perforation is 0084 mm long and therefore 16 perforations are formed in a 1.35 mm length of the track (two tracks being simultaneously formed in the moving web. In FIG. 5B the same pattern has a 12.5% blanking period and in FIG. 5C the pattern has a 25% blanking period producing 14 and 12 perforations respectively over a 1.35 mm length. FIGS. 5D to 5F show three rows of macro-perforations 81 and FIGS. 5G to 5J show two rows of macro-perforations 82 drawn on the same scale as FIGS. 5A to 3C.

It will be understood that "blanked" holes result from the primary laser beam being allowed to pass momentarily onto the heat sink 52 as a result of no drive signal being applied to the beam deflector.

In FIGS. 5A to 5C each perforation pattern repeats at 1.35 mm intervals which may be termed the repetition length. In practice the repetition length and the spacing between rows may be such that the perforations are similarly spaced in both directions, i.e. along the web and transversely thereto In FIGS. 5B and 5C there are respectively two and four adjacent blanked micro-perforations in each repetition length. As an alternative the blanked perforations may be evenly or randomly distributed over the repetition length by using a binary rate multiplier to determine the positions of the blanked perforations. In order not to change the mean distance of the perforations from the mouth end of the cigarette, blanking may be arranged to start at the center rows and then progress, when lower porosity is needed, towards the outer rows. Another possibility is that each stepped sweep of the laser beam may be following by a blanking period (i.e., with the beam parked in the heat sink) of which the duration is controlled by the pattern generator 47.

In the examples shown in FIGS. 5D to 5F and FIGS. 5G to 5J, one macro-perforation is totally blanked over each repetition length before a second perforation starts to be blanked In an alternative arrangement the macro-perforations may be all blanked (shortened) in substantially equal amounts Increasing the repetition length in the illustrated examples will increase the resolution of the system, but the repetition length must be at least an order of magnitude less than the circumference of a finished cigarette. The 4-bit perforation demand signal allows a resolution of 1 in 16 (6.25%), but more bits may be provided if greater resolution is required.

A machine operating at 8000 cigarettes per minute requires 4000 27 mm lengths of tipping paper per minute, which is equivalent to 1.8 meters per second. Therefore, to produce micro-perforations in the paper (as shown in FIG. 5A) when operating at this speed, the laser must produce more than 21000 perforations per second in each track. The power and width of the beam at points 40 and 45 must be such that the paper is perforated when the machine is operating at maximum speed. While the position of the beam is being deflected between rows, the high speed at which such deflection occurs ensure that the web is not cut between perforations.

When the machine is operating at below full speed, it is desirable that the perforation pattern should appear similar to that produced in full-speed operation. For that purpose in the case of micro-perforation, the period during which each beam is directed onto the paper for each perforation may be fixed. When the machine is running at below full speed, each such period is followed by a blanking period before the beam is brought back onto the paper to form the next perforation. As a result, although each perforation at the lower machine speed will tend to be shorter (because the paper moves through a smaller distance while the laser beam is impinging on it), it will also tend to be slightly wider because the laser beam will have time, at the lower web speed, to burn out a hole more nearly equal to the full width of the focused laser beam. Thus the perforations will appear to the naked eye to be approximately the same size. Any necessary additional compensation can be provided by the porosity measuring device 11. It will be understood that the intervals at which perforations are formed will be constant as a consequence of the clock pulse 65 applied to the pattern generator 47.

Figure 6:
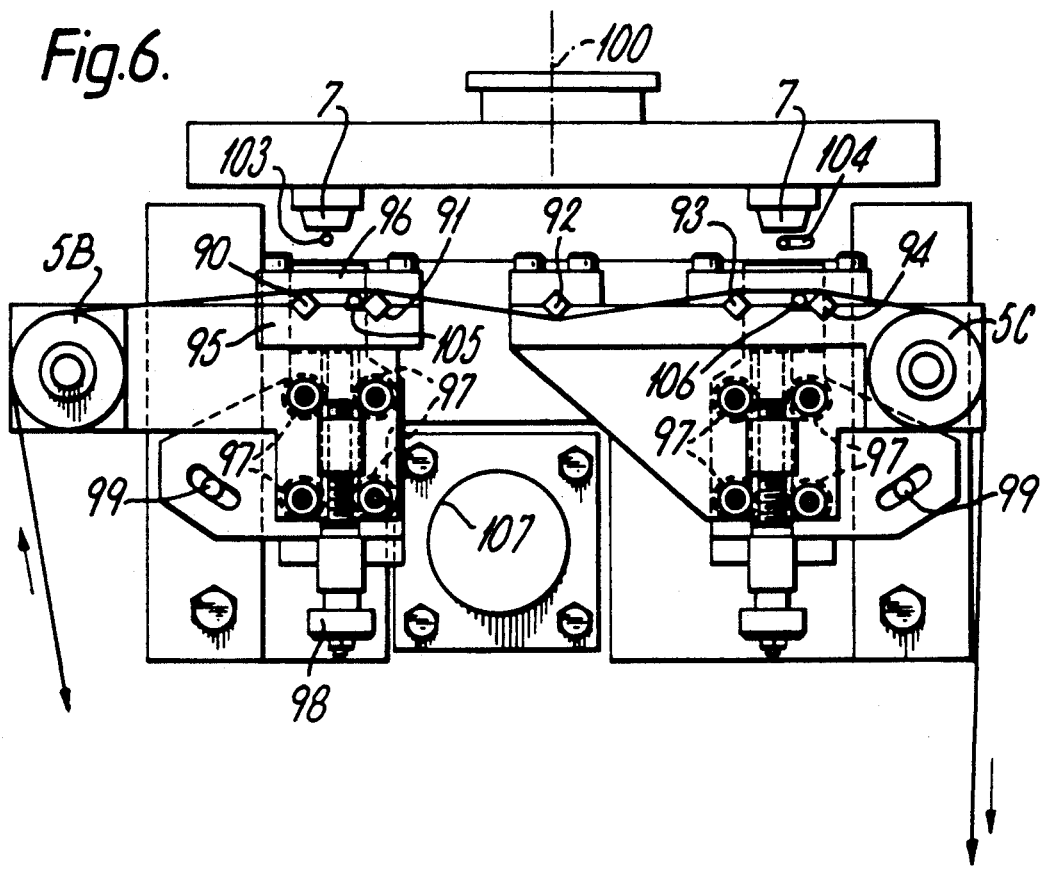
FIG. 6 is a front elevation of the web guide assembly shown generally in FIG. 1.
Figure 7:
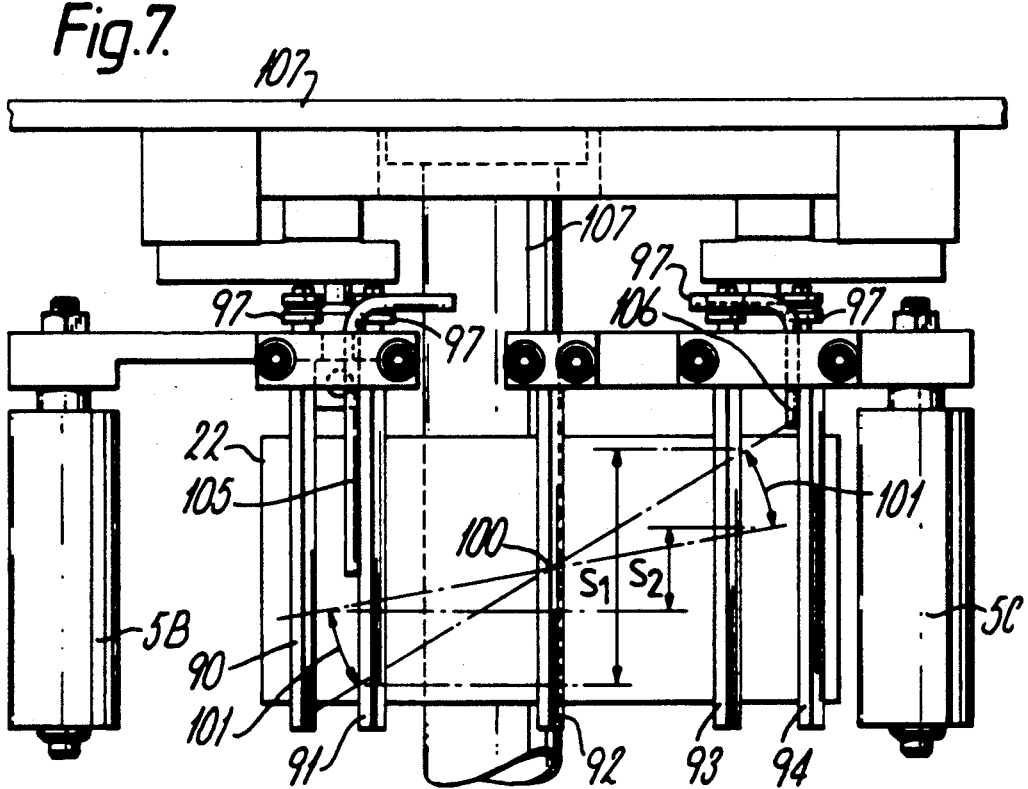
FIG. 7 is a plan view of the web guide assembly with certain parts removed.

FIGS. 6 and 7 show one form of web guide assembly which may be used in FIG. 1.

As shown in FIG. 6, the web 1 passes around rollers 5B and 5C between which it is guided first by bars 90 and 91 in a first perforation region, then by bar 92 and finally by bars 93 and 94 in a second perforation region. Each of the bars has a sharp straight edge engaging the web. The bar 92 deflects the web downwards to ensure that it runs in contact with the other bars, the path of the web being precisely horizontal between bars 90, 91 and 93, 94 respectively.

The bars 90 and 91 are clamped in position at one end by members 95 and 96 forming part of a vertically adjustable assembly which is guided for vertical movement by V-groove rollers 97 serving as a linear bearing. Vertical adjustment is effected by rotating a screw 98. Thus correct focusing of the laser beam from the left-hand nozzle 7 onto the web between bars 90 and 91 can be achieved. The assembly including bars 93 and 94 is similarly but independently adjustable vertically.

In addition, each of the vertically adjustable assemblies can be adjusted by slight tilting to ensure that the path of the web in each perforation area can be set precisely horizontal in the event of any initial manufacturing area. Screws 99 secure the assemblies after they have been tiled to the extent (if any) which may be necessary.

Rotation of the laser assembly (item 9 in FIG. 1) to adjust the perforation track spacing occurs about a vertical axis 100. The range of movement of the axes of the nozzle 7 resulting from such adjustment is shown by double-headed arrows 101 in FIG. 7. Thus in this example the maximum and minimum distances between the center lines of the perforation tracks are S1 and S2 respectively. It should be noted that the positions of the laser beams throughout this range of adjustment not only lie above the horizontal portions of the web (so that focusing is unaffected) but also result in each residual beam passing through the web having a path which carries it past the bars 90, 91, 93 and 94. Below those bars there is a horizontal plate 102 (not shown in FIG. 6) which absorbs the energy of the residual beams.

In order to convey away debris left by the perforation process, there are four pipes 103 to 106 which blow air generally across the web. The pipes 103 and 104 are not shown on FIG. 7. The pipes 105 and 106 are below the web and terminate just behind the perforation areas, as shown in FIG. 7. The pipes 103 and 104 are above the web and are arranged to direct jets of air below and across the bottom ends of the nozzles 7; the pipe 104 is inclined slightly as shown.

The pipes 103 to 106 blow debris towards and into two suction ports (not shown) communicating with a suction pipe 107 for drawing away the debris.

The entire web guide assembly is mounted on a support 108 (FIG. 7).

It is particularly important to ensure that no particles of solid debris can reach the lenses 39 and 44. Protection of the lenses 39 and 44 may be achieved by supplying clean dry air, Nitrogen or other gas at above-atmospheric pressure into the nozzles 7 (FIG. 1) so that the air or Nitrogen blows downwards out of the nozzles and then helps to resist the entry of any foreign particles into the nozzles.

In addition there may be a casing around each nozzle defining an annular space around the nozzle which is supplied with compressed air (which need not be highly cleaned air) so as to blow air downwards as a converging annular curtain of air around the nozzle, preferably focused to a point above the paper. This will tend to induce a flow of clean air or other gas from the nozzle; in a preferred arrangement the clean gas is fed into the nozzle from a high-pressure source via a restrictor, the result being a relatively low consumption of clean gas. The high-velocity curtain of air will also help to prevent solid debris from settling on the nozzle.

Various additional or alternative means of controlling the laser system will now be described.

As already mentioned, it is important to ensure that the cigarettes all have substantially the same dilution factor. Therefore, for example, if the beam splitter is or becomes inaccurate in its splitting of the primary beam, or if a mirror or lens in the path of one of the secondary beams changes in its transmission or reflection characteristic, it is preferable to include means for compensating for that while the system is in operation. For that purpose the dilution signal from the cigarette inspection device 4 is received, by means of an electronic clocking circuit, as two separate signals derived from the cigarettes in the two respective rows formed by cutting the double cigarette assemblies in half. Each signal is smoothed and is compared with the other by means of any suitable comparator device. Any difference is used to generate a compensation signal for adjusting the laser system in order to reduce or preferably eliminate the difference. In general the compensation signal may be used to adjust either one or both halves of the perforation system (for example in accordance with the principle described in our U.S. Pat. No. 4390032); in the latter case one half would be adjusted in one sense while the other half is adjusted in the other sense, thus minimizing the adjustment needed in either half.

The following are examples of ways in which the compensation signal may be implemented:

1) The relative strengths of the two secondary beams 36 and 37 can be adjusted by adjusting the beam splitter. In principle that can be achieved by altering slightly, and to the same extent, the angles to the vertical of the semi-reflective mirror 34 and mirror 38. Those two mirrors must remain parallel; decreasing their angle of inclination to the vertical will increase the strength of the secondary beam 36 and correspondingly reduce the strength of the secondary beam 37, and vice versa. However, in order to avoid displacing the beam focus point 40 it will be appreciated that any servo-controlled adjustment of the beam splitter would need to displace at least one of those mirrors and not merely rotate each about its own horizontal center line. As an alternative, the semi-reflective mirror 34 may be replaced by a grid polarizer device. With such a device the orientation the grid in relation to the plane of polarization of the primary laser beam (which is normally in a polarized state as it leaves the laser) determines the proportions of the primary beam that respectively reflect off and pass through the grid. Thus the grid can be rotated in its own plane (i.e., about an axis normal to the plane of the grid)

by any suitable electrical or other servo means to adjust the relative strengths of the secondary beams. Examples of grid polarizer devices are offered by Optometrics (UK) Ltd. Unit D9, Cross Green Approach, Leeds, LS9 OSG and also (in fact in lower power versions) by Cambridge Physical Sciences, Bar Hill, Cambridge, CBB 8EZ, and by Rofin Ltd., Winslade House, Egham Hill, Surrey, TW20 OAZ (see also the description by J. P. Auton in Applied Optics Vol. 6, June 1967, pages 1023-1027. Another example of a type of adjustable beam slitter which can in principle be used is described in U.S. Pat. No. 3,767,310.

2) The focusing of one laser beam (or of both) on the paper may be controlled by providing a servo device to adjust the vertical position of the paper or, theoretically, of the corresponding lens, thus increasing or reducing the spot size (i.e. the area of the paper on which the laser beam impinges). Providing the laser beam power is sufficient, changing the spot size will change the size of the perforations.

3) The mean distance of the perforations from the mouth end of the cigarette affects the dilution: the smaller the distance, the greater is the dilution. Hence, the compensation signal can be used to displace the paper web laterally, thus increasing the mean distance for one row of cigarettes while reducing it for the other row. Alternatively, the compensation signal can be arranged (with a multi-row perforation track) to impose on the pattern generator a bias or control which increases the amount of material removed along one side of each track or by reducing it along the other side of the track, or by effecting both those changes, thus altering the effective mean distance of the holes from the mouth end of the cigarette.

It should be noted that the mirror system shown in FIG. 3 causes the two secondary beams to move in unison; i.e. both are deflected in the same direction. Thus the above-mentioned operation of the pattern generator will increase the dilution of the cigarettes in one row while decreasing that of the other row. As a simpler alternative, the perforation tracks as a whole may be displaced laterally by applying a suitable bias to the signal supplied to the drive unit 48.

4) Instead of a single beam deflector being used, there may be two beam deflectors arranged in the paths of the respective secondary beams. Amongst other advantages, that would enable the powers of both secondary beams to be separately controlled to compensate for any tendency of the two rows of cigarettes to have different dilution factors for any reason at all.

Assuming that a single beam deflector is used, if it is desired to avoid unison movement of the secondary beams, that can be achieved by replacing the mirror 43 with two mirrors each for example arranged to deflect the beam in turn through 45°, thus reversing the direction of deflection by the beam deflector. This may be desirable, for example, if asymmetrical perforation patterns are required to be applied to both rows of cigarettes so that they will have the same orientation after the rows have been combined by a tip turner in the usual way.

The power of the laser output may be controlled as part of the provision for controlling cigarette dilution, and/or such control may be exercised continuously in order to use the minimum power consistent with satisfactory operation of the perforation system. For example, for a given perforation pattern, if the number of perforations which have to be blanked (omitted) to achieve a desired dilution level exceeds a predetermined limit (possibly as a result of the paper having a lower mass per unit area than expected), the system may be arranged to reduce the laser power automatically. Conversely, if the required dilution level is suddenly found to be achieved only by blanking practically none of the perforations then the laser power may be automatically increased.

Power reduction of the laser cannot readily be achieved instantaneously. Consequently when a need for a reduction is detected, that may initially be achieved by means of the beam deflector, i.e. by reducing the drive signal so that a larger proportion of the beam passes to the heat sink. Then when the power output of the laser is reduced, the drive power to the beam deflector is restored so that as much as possible of the beam from the laser is again made available for perforating.

One important advantage of the laser perforation system according to this invention is that it can readily be set, by adjustment of the pattern generator, to produce a variety of different perforation patterns. Added flexibility can be achieved by making provision in the pattern generator for what may be termed "spot wobble". That is to say, instead of the focused laser beam (the "spot") remaining stationary during each of the perforation steps 80, 81 or 82 shown in FIG. 5, it may have imposed upon it a high-frequency wobble so as to move laterally with respect to the direction of movement of the paper web. For example, the wobble frequency may be in the range 100 KHz to 1000 KHz. The effect of the wobble, provided there is sufficient laser power, will be to increase the rate at which material is removed. Thus for a given spot size the width of the perforations can be varied. This feature would facilitate the formation of a combination of macro and micro perforations: the macro-perforations can be made wider and thus more visible by wobbling the spot while each is being formed, the wobble being stopped for each micro-perforation. Alternatively, or in addition, spot wobble of controllable amplitude can be used as a means of controlling the overall cigarette dilution or for equalizing the dilution of the two rows of cigarettes.

Spot wobble may be produced by imposing any suitable wave form on the drive signal to the drive unit 48; for example, the wave form may be a square wave, sinosoidal or triangular (zig-zag). Spot wobble of variable amplitude may also be used as a means of controlling dilution by varying the width of the perforations while possibly maintaining a fixed number of perforations A further possibility we have found is that by wobbling the spot by means of a square wave of sufficient amplitude, two side-by-side perforations are formed at each step, thus enabling an eight-row micro-perforation pattern, for example, to be converted to a sixteen-row pattern of somewhat more random-looking layout.

In the case of macro-perforations, in order to avoid any problem with adhesive passing through the perforations and contaminating the outside of the cigarette, perforations may be omitted in regions close to the positions at which the web of tipping paper is cut. At those regions it may be desirable to apply an extra thickness of adhesive in the filter assembly process to ensure that the edges of the tipping paper are well secured.

In addition to the beam deflector controlling the laser spot transversely with respect to the direction of movement of the web (or other workpiece, for example a cigarette) there may be a second beam deflector for controlling the laser spot in the direction of movement of the web or other workpiece. By this means, for example, the spot may be kept stationary with respect to the web for a predetermined period, possibly in order to form a relatively large perforation or in order to allow use of a laser of relatively low power. Another possibility created by the provision of two beam deflectors is that rows of perforations can be formed in directions at right angles to the direction of movement of the web. This latter possibility may be useful, for example, for perforating a web of tipping paper for use in an in-line filter cigarette assembler. With such a machine, in order to produce ventilated cigarettes it is necessary to form rows or zones of perforations extending across the tipping paper web at spaced positions along the web. Each row or zone can be formed by a number of staggered secondary beams produced by splitting a primary beam which is controlled by two beam deflectors so that each secondary beam sweeps across part of the width of the tipping paper.

In accordance with the invention described in our British Patent No. 1541425, it may be desired to check from time to time that the cigarette inspection device is working properly. That may be achieved by momentarily underperforating or overperforating the tipping paper and then automatically monitoring the system to ensure that cigarettes formed with the incorrectly perforated tipping paper are ejected by the inspection device.

We claim:

1. A method of producing ventilated filter cigarettes, comprising directing a laser beam onto a web of cigarette tipping paper, from which portions are to be cut to join filters to tobacco rod portions, to produce at least one longitudinally extending perforation track along the web; and controlling the position of the laser beam by means of a laser beam deflector to direct the beam during selected periods along a path in which it impinges on and perforates the web, and during other selected periods to direct it in a manner such as not to perforate the web, so as to control the formation of perforations in the web.

2. A method according to claim 1 in which the formation of perforations is controlled in response to the porority of the perforated web, or to the dilution of the finished cigarettes, or to both.

3. Apparatus for producing ventilated cigarettes, comprising means for generating a laser beam; means for directing the laser beam onto a web of cigarette tipping paper to produce at least one longitudinally extending perforation track along the web; filter assembly means including means for cutting the perforated web into portions and means for joining filters to tobacco rods with said portions; and control means for controlling the position of the laser beam including a laser beam deflector arranged to direct the beam during selected periods along a path in which is impinges on and perforates the web and during other selected periods to direct it in a manner such as not to perforate the web, so as to control the formation of perforations in the web.

4. Apparatus according to claim 3 including means for measuring the porosity of the perforated web and for producing a signal indicative thereof, and/or means for measuring the dilution of the finished cigarettes and for producing a signal indicative thereof, and means for controlling the formation of perforations in response to one or both of such signals.

5. Apparatus according to claim 3 in which the laser beam deflector is an acousto-optical device having diffraction properties which vary with the frequency of an applied alternating voltage.

6. Apparatus according to claim 5 including a drive unit arranged to supply an alternating voltage to the deflector device which varies in frequency so as to produce a predetermined pattern of perforations in the web, the drive unit being controlled in response to one or both of the said signals to adjust the pattern and thus maintain cigarette dilution at a substantially constant average level.

7. Apparatus according to claim 6 in which the drive unit is arranged to control the amount of material removed from the web by the laser beam.

8. Apparatus according to claim 3 including a heat sink onto which the deflector device is arranged to direct the beam while the beam is not required to perforate the web.

9. Apparatus according to claim 3 including a beam splitter arranged to split the beam, after it has passed through the deflector device, into two secondary beams of substantially equal power to form two laterally spaced perforation tracks along the web.

10. Apparatus according to claim 9 in which the beam splitter together with mirrors and lenses for the secondary beams form part of an assembly which is rotatably adjustable about an axis corresponding to the mean center line of the primary beam so as to adjust the distance between the two perforation tracks.

11. Apparatus for forming a predetermined pattern of perforations in a moving component of the cigarette industry (especially but not necessarily cigarette tipping paper for use in making filter tipped cigarettes) comprising means for generating a laser beam for perforating the component, and an acousto-optical or other electrically driven beam deflector arranged in the path of the beam and having a controllable drive whereby deflection of the beam is controlled to cause the beam to impinge on and perforate the component at selected positions during selected periods, and to avoid perforating the component during other selected periods.

12. Apparatus according to claim 11 including a heat sink onto which the beam deflector is arranged to direct the beam when the beam is not required to perforate the component.

13. Apparatus according to claim 12 in which the beam deflector is an acousto-optical device and the path of the beam, when inoperative, extends from the beam deflector in a direction in line with the beam deflector.

14. Apparatus according to claim 13, in which the drive signal for controlling the deflection of the beam is applied to the beam deflector by a drive unit arranged to supply a signal which varies in amplitude to control the proportion of the beam power deflected by the beam deflector.

15. Apparatus according to claim 11 in which the beam deflector is controlled so that the impingement point of the beam on the workpiece briefly follows the movement of the workpiece while forming each perforation.

16. Apparatus according to claim 15 for perforating cigarettes, including means for rotating each cigarette in turn about its own axis while it is being perforated.

17. Apparatus for producing ventilated filter cigarettes, comprising means for cutting a web of cigarette tipping paper into a series of portions; means for joining pairs of cigarette rods to double length filters to form a succession of double cigarette assemblies; means for cutting each assembly in half to produce two filter cigarettes; means for producing a primary laser beam; means for splitting the primary beam to produce two secondary beams of substantially equal power; means for directing each secondary beam onto the cigarette tipping paper to provide at least one longitudinally extending perforation track in each subsequently formed cigarette; means for measuring the dilution of the finished cigarettes and means for controlling the secondary beams in response to said dilution.

18. Apparatus according to claim 17 including means for producing separate dilution signals for the two halves of each double cigarette assembly, and means for automatically adjusting the beam splitter to maintain substantial equality between the averages of the two dilution signals.

19. Apparatus for perforating cigarette tipping paper comprises means for producing a primary laser beam, means for directing the primary laser beam towards the path to be followed by a web of tipping paper, in a direction normal to the plane of the web and in alignment substantially with the center line of the web; means for splitting the primary laser beam to produce two parallel secondary beams and for directing and focusing the two secondary laser beams onto the web to produce two laterally spaced perforation tracks on the web, each comprising at least one row of perforations; and means for rotatably mounting an assembly including the secondary beam focusing means, rotation being about the axis or mean axis of the primary beam so that angular adjustment of the assembly about that axis alters the spacing between the two perforation tracks.

20. Apparatus for producing ventilated cigarettes, comprising means for generating a laser beam; means for directing the laser beam onto a web of cigarette tipping paper to produce at least one perforation pattern on the web; filter assembly means including means for cutting the perforated web into portions each including at least one perforation pattern; means for joining filters to tobacco rods with said portions; and control means for controlling the position of the laser beam including a laser beam deflector for scanning the laser beam on the surface of said web in a selected pattern, so as to control the pattern of perforations in the web.

21. Apparatus according to claim 20, wherein said selected pattern comprises at least one recognizable character, such as a symbol, emblem, letter or logo.

22. Apparatus according to claim 20, wherein said control means includes a programmed pattern generator capable of controlling said laser beam deflector to scan said laser beam in a pattern according to external selection of pre-programmed patterns.

23. Apparatus according to claim 22, wherein said pattern generator includes means for selectively controlling said laser beam deflector so as to superimpose on the scanning movement of said beam high frequency wobble in at least one direction, so as to increase the rate at which material is removed in perforating said web.

24. Apparatus for producing ventilated cigarettes, comprising means for generating a laser beam; means for directing the laser beam onto a web of cigarette tipping paper to produce at least one longitudinally extending perforation track along the web; filter assembly means including means for cutting the perforated web into portions and means for joining filters to tobacco rods with said portions; and control means for controlling perforation of the web by the laser beam including a laser beam deflector arranged to direct the beam during selected periods at a first speed along a first path in which it impinges on and perforates the web and during other selected periods to direct it at a second speed at which it is not capable of perforating the web, so as to control the formation of perforations in the web.

25. Apparatus according to claim 24, wherein said control means includes means for controlling said laser beam deflector to subject said beam to continuous rapid defection when the beam is not required to perforate.

26. Apparatus for producing ventilated cigarettes, comprising means for generating a laser beam; means for directing the laser beam onto a web of cigarette tipping paper to produce at least one longitudinally extending perforation track along the web; filter assembly means including means for cutting the perforated web into portions and means for joining filters to tobacco rods with said portions; and control means for controlling perforation of the web by the laser beams including a laser beam deflector so that the power of the beam impinging on said web is controlled by controlling the deflection of the beam by said laser beam deflector.

27. Apparatus according to claim 26, wherein said control means further includes drive means for supplying to said laser beam deflector a control signal which varies in amplitude to control the proportion of the beam power deflected by the laser beam deflector onto said web.

* * * * *